T. J. REED.
TIRE.
APPLICATION FILED JUNE 26, 1919. RENEWED APR. 2, 1921.
1,379,043.
Patented May 24, 1921.
2 SHEETS—SHEET 2.
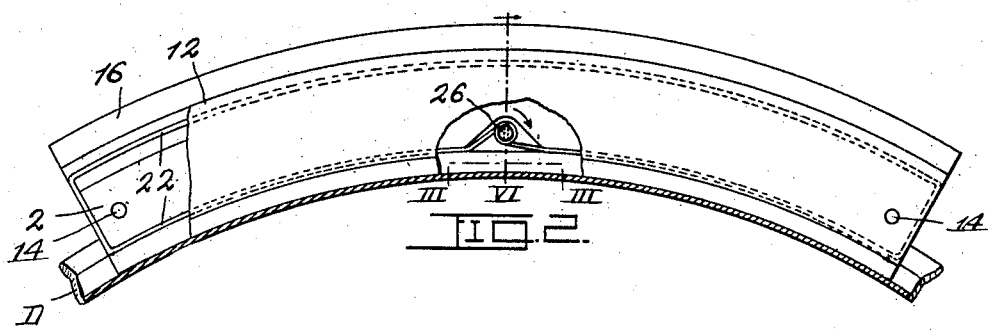
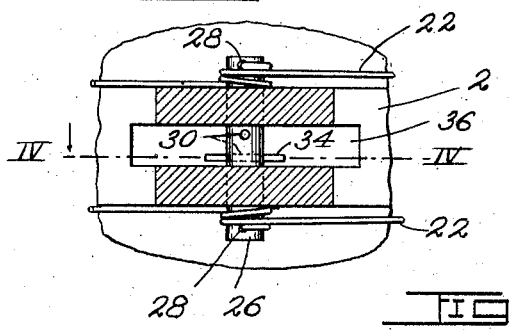
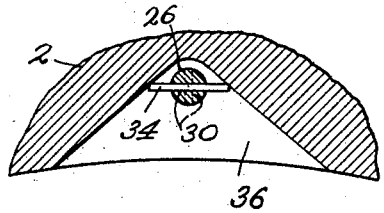
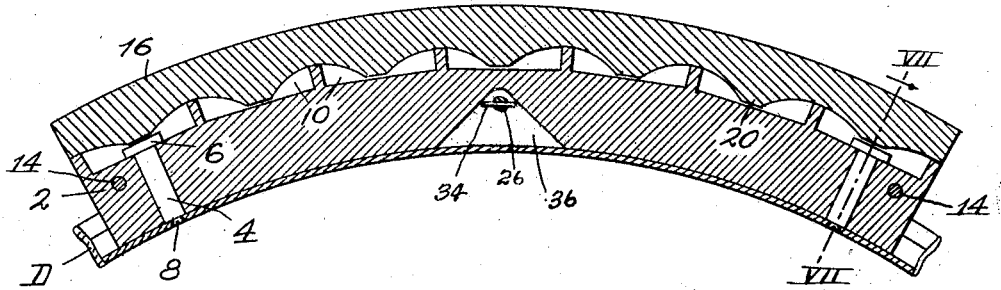
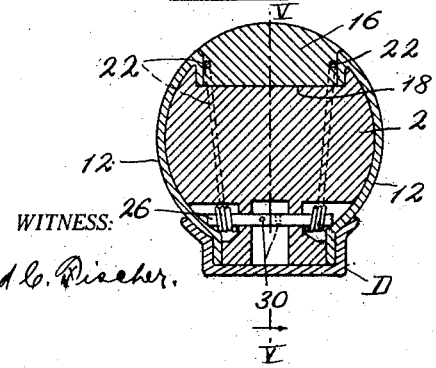
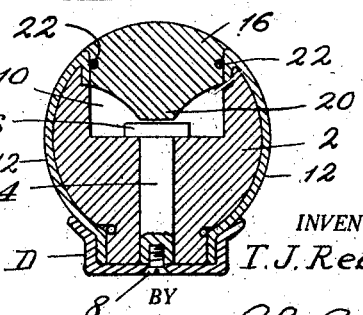
WITNESS:
Fred C. Fischer.
INVENTOR.
T. J. Reed,
BY
F. G. Fischer,
ATTORNEY.

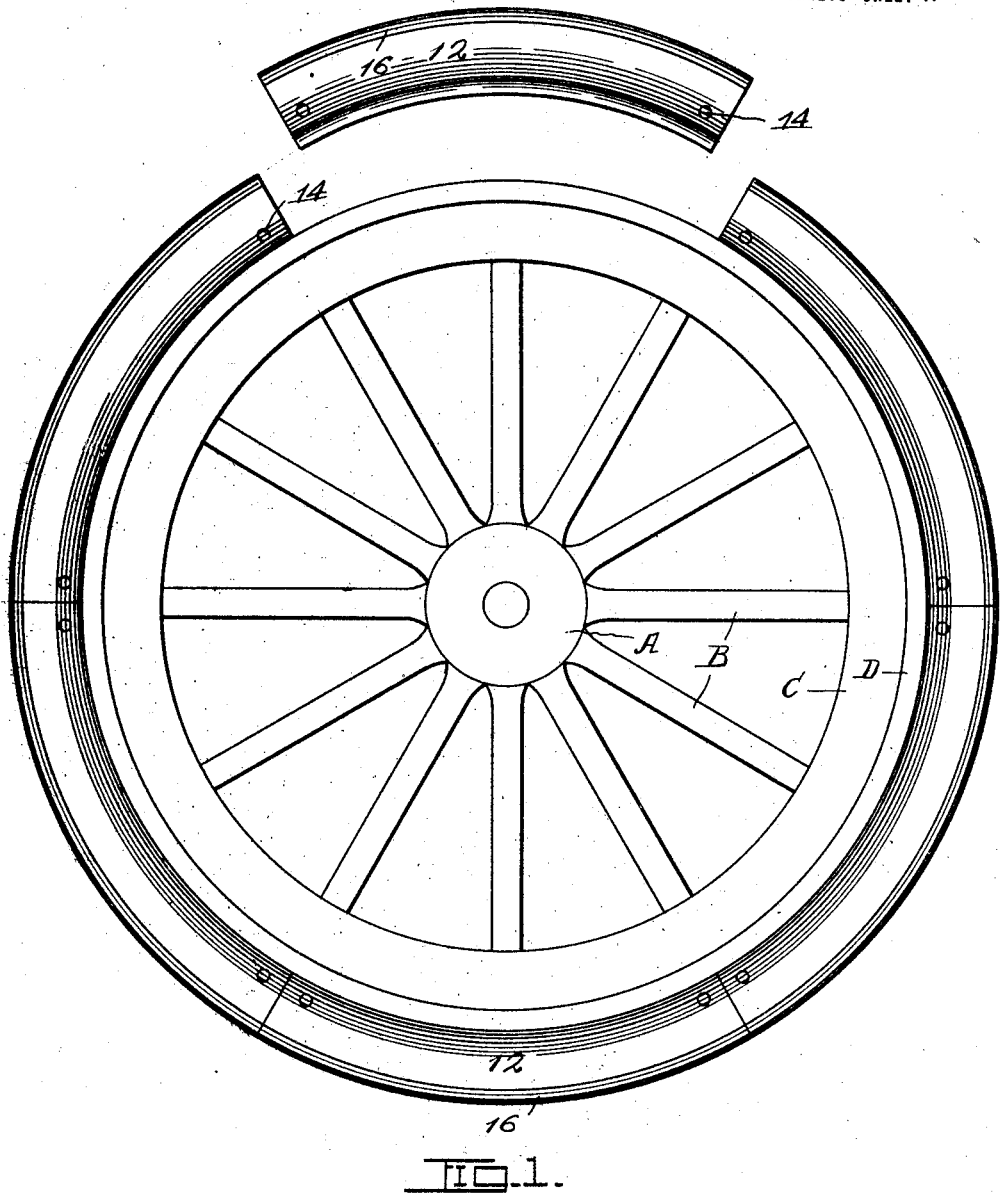

UNITED STATES PATENT OFFICE.

THEODORE J. REED, OF KANSAS CITY, MISSOURI.

TIRE.

1,379,043. Specification of Letters Patent. Patented May 24, 1921.

Application filed June 26, 1919, Serial No. 306,849. Renewed April 2, 1921. Serial No. 458,083.

*To all whom it may concern:*

Be it known that I, THEODORE J. REED, a citizen of the United States, residing at Kansas City, in the county of Jackson and State of Missouri, have invented certain new and useful Improvements in Tires, of which the following is a specification.

My invention relates to improvements in tires for automobiles and other vehicles requiring resilient tires, and my objects are to provide a durable tire of this character possessing the necessary resiliency, one which is puncture proof, one which is blow-out proof, and one which is made in sections, so that should any section become too badly damaged for further use it can be replaced at low cost and without discarding the complete tire.

Other objects of the invention will hereinafter appear, and in order that said invention may be fully understood, reference will now be made to the accompanying drawings, in which:

Figure 1 is a side elevation of a vehicle wheel equipped with my tire, one of the sections being removed from the normal position which it occupies when incorporated in said tire.

Fig. 2 is a broken side elevation of one section of the tire in position on the rim of the wheel.

Fig. 3 is an enlarged, fragmentary section on line III—III of Fig. 2.

Fig. 4 is a section on line IV—IV of Fig. 3.

Fig. 5 is a vertical section on line V—V of Fig. 6.

Fig. 6 is a cross section on line VI of Fig. 2.

Fig. 7 is a cross section on line VII—VII of Fig. 5.

Referring now in detail to the various parts, A designates the hub, B the spokes, C the felly, and D the metal rim of the wheel which may be of ordinary or any preferred construction.

Referring now particularly to the tire which constitutes the present invention, 2 designates a plurality of segments which are placed end to end to form a ring around the metal rim D, as disclosed in Fig. 1. The segments 2 consist, preferably, of light but tough wood, although aluminum or other light metal segments may be employed to advantage. The segments 2 are removably secured to the wheel rim D by bolts 4, each of which is provided at one end with a head 6 and at its opposite end with an internally threaded bore to receive a screw 8 which extends through a hole in the rim D.

The ring segments 2 are provided at their outer surfaces with air pockets 10 in which air is compressed, as will hereinafter appear, when the tire is in use. When the ring segments 2 are constructed of wood their outer sides are protected by metallic wear-plates 12, which are attached to said segments 2 by suitable means such as rivets 14. The wear-plates 12 are of the same length as the ring segments 2 and extend from the wheel rim D to a rubber or other resilient tread 16 surrounding the ring formed by said segments 2. Said wear-plates 12 protect the sides of the segments from contact with curbings, the sides of ruts, etc.

The tread 16, like the ring segments 2 and the wear-plates 12, is made in sections and each section is seated in a peripheral groove 18 in its respective ring segment 2. Each section of the tread 16 has protuberances 20, which project into the air pockets 10 to aid in compressing the air therein as will hereinafter appear.

A pair of cables 22 are, preferably, employed to firmly secure each section of the tread 16 in the groove 18 of its respective ring segment 2. Each pair of cables 22 is embedded in opposite sides of their respective tread section the full length thereof and extend inwardly around the ends and inner side of the ring segment 2 to a small drum 26, around which their ends are wound.

The drum 26 extends transversely through the ring segment 2 and is provided adjacent its ends with eyes 28 through which the ends of the cables 22 are threaded preparatory to winding them upon said drum 26, which is accomplished by rotating the drum in the direction of the arrow, Fig. 2. Rotation of the drum 26 is accomplished through the intermediacy of two pins, not shown, which are alternately thrust through the eyes 30 extending transversely through said drum 26 at angles of ninety degrees to each other.

By placing one pin in one of the eyes 30 the drum 26 may be rotated a quarter of a revolution and held at this point until the other pin is thrust through the other eye 30, whereupon the first pin is removed, so that the drum may be rotated another quarter of a revolution. These operations are repeated until the cables 22 have been drawn sufficiently taut to hold the tread section firmly in position upon its respective ring segment 2. The drum 26 is then held from backward rotation by placing a short pin 34 in one of the eyes 20 and allowing said pin to engage the walls of a recess 36 in the ring segment 2, as disclosed on Fig. 4.

When the tire is assembled and placed in position upon the wheel the weight of the latter and its load causes the lower protuberances 20 to spread in the lower air pockets 10 and compress the air therein. Thus as the wheel rolls along the air is compressed in the pockets 10 as they successively pass to the lower portion of the wheel, and produce a cushioning effect similar to that obtained with a pneumatic tire. At the same time puncture of the tread will produce no such ill effect as results from the puncture of a pneumatic tire, as the former cannot collapse like the latter.

While I have shown and described the preferred form of my device I reserve the right to make such changes in the construction, combination and arrangement of parts as properly fall within the spirit and scope of the claims.

Having thus described my invention, what I claim and desire to secure by Letters Patent, is:

1. A tire consisting of a ring comprising a plurality of relatively nonresilient segments having air pockets therein, and a resilient tread extending around said ring and consisting of sections secured to the ring segments and provided with protuberances that project into the air pockets, substantially as described.

2. A tire consisting of a ring comprising a plurality of relatively nonresilient segments having peripheral grooves, and air pockets communicating with said grooves, and a resilient tread seated in said peripheral grooves and adapted to compress the air in the pockets.

3. A tire consisting of a ring of relatively nonresilient material having a peripheral groove and air pockets communicating with said groove, and a resilient tread seated in said peripheral groove and provided with protuberances which project into the air pockets.

In testimony whereof I affix my signature, in the presence of two witnesses.

THEODORE J. REED.

Witnesses:
F. G. FISCHER,
L. J. FISCHER.